United States Patent
Kuroda

(10) Patent No.: US 9,664,374 B2
(45) Date of Patent: May 30, 2017

(54) ILLUMINATED MIRROR DEVICE AND METHOD FOR CONTROLLING ILLUMINATION THEREOF

(75) Inventor: Kazuo Kuroda, Yokohama (JP)

(73) Assignee: PIONEER CORPORATION, Kawasaki-Shi, Kanagawa (JP)

( * ) Notice: Subject to any disclaimer, the term of this patent is extended or adjusted under 35 U.S.C. 154(b) by 0 days.

(21) Appl. No.: 14/404,945

(22) PCT Filed: Jun. 1, 2012

(86) PCT No.: PCT/JP2012/064288
§ 371 (c)(1),
(2), (4) Date: Feb. 12, 2015

(87) PCT Pub. No.: WO2013/179483
PCT Pub. Date: Dec. 5, 2013

(65) Prior Publication Data
US 2015/0145408 A1 May 28, 2015

(51) Int. Cl.
*B60Q 1/14* (2006.01)
*F21V 33/00* (2006.01)
*A47G 1/00* (2006.01)
*A47G 1/02* (2006.01)
*B60Q 3/252* (2017.01)
(Continued)

(52) U.S. Cl.
CPC .............. *F21V 33/004* (2013.01); *A47G 1/00* (2013.01); *A47G 1/02* (2013.01); *B60Q 3/252* (2017.02); *B60Q 3/80* (2017.02); *H05B 33/0854* (2013.01); *H05B 33/0896* (2013.01); *A47G 2200/08* (2013.01); *F21W 2131/302* (2013.01)

(58) Field of Classification Search
CPC ............................ B60Q 3/0226; B60Q 3/0293
USPC ............................................. 315/77; 362/492
See application file for complete search history.

(56) References Cited

U.S. PATENT DOCUMENTS

2005/0237756 A1* 10/2005 Ogawa ................. B60Q 3/0226
362/492
2006/0181893 A1* 8/2006 Fernandez ............. B60J 3/0282
362/494
(Continued)

FOREIGN PATENT DOCUMENTS

DE 102010044320 A1 3/2012
JP H07-081483 A 3/1995
(Continued)

OTHER PUBLICATIONS

International Search Report and Written Opinion for PCT/JP2012/064288, dated Jul. 17, 2012, 6 pgs.
(Continued)

*Primary Examiner* — Tung X Le
(74) *Attorney, Agent, or Firm* — Procopio, Cory, Hargreaves & Savitch LLP

(57) ABSTRACT

Provided is an illuminated mirror device including: a mirror; a light-emitting part for illumination disposed near the mirror; and driving means for driving the light-emitting part, and detection means for detecting a direction of a face of a person in front of the mirror with respect to the mirror, wherein the driving means controls an emission luminance distribution on a light-emitting surface of the light-emitting part on the basis of the face direction detected by the detection means. Also provided is a method for controlling illumination thereof.

22 Claims, 6 Drawing Sheets

(51) Int. Cl.
*B60Q 3/80* (2017.01)
*H05B 33/08* (2006.01)
*F21W 131/302* (2006.01)

(56) References Cited

U.S. PATENT DOCUMENTS

| | | | | |
|---|---|---|---|---|
| 2007/0120691 | A1* | 5/2007 | Braun | B60K 28/063 |
| | | | | 340/576 |
| 2008/0292151 | A1* | 11/2008 | Kurtz | A61B 3/10 |
| | | | | 382/128 |
| 2011/0019391 | A1* | 1/2011 | Welter | B60J 3/0282 |
| | | | | 362/142 |
| 2012/0069444 | A1* | 3/2012 | Campbell | B60R 1/12 |
| | | | | 359/630 |

FOREIGN PATENT DOCUMENTS

| | | |
|---|---|---|
| JP | 11-046945 | 2/1999 |
| JP | 2002199995 A | 7/2002 |
| JP | 2003-116633 | 4/2003 |
| JP | 2003-217868 | 7/2003 |
| JP | 2007-069808 | 3/2007 |
| JP | 2008018058 A | 1/2008 |
| JP | 2010256066 A | 11/2010 |
| JP | 2011-015892 | 1/2011 |
| WO | 2009077946 A1 | 6/2009 |
| WO | 2011158143 A1 | 12/2011 |
| WO | 2012023096 A2 | 2/2012 |

OTHER PUBLICATIONS

Office Action for Korean Appln. No. 10-2014-7033592 transmittal date Nov. 20, 2015.

Extended European Search Report for EP App No. 12877828.9 dated Jan. 20, 2017, 9 pgs.

* cited by examiner

ILLUMINATED MIRROR DEVICE AND METHOD FOR CONTROLLING ILLUMINATION THEREOF

TECHNICAL FIELD

The present invention relates to an illuminated mirror device and a method for controlling illumination thereof.

BACKGROUND ART

There are illuminated mirror devices capable of reflecting an object such as a face in a mirror even in a dark place. As a conventional illuminated mirror device, Patent Document 1 describes a mirror equipped with EL illumination having EL (Electro Luminescence) elements arranged in a frame shape around the mirror. Patent Document 2 describes a full-length mirror having a half mirror provided adjacent to a mirror surface thereof and an illumination device attached to a rear side of the half mirror. Also, Patent Document 3 describes an illuminated mirror cabinet in which a light-transmitting part without a silver film is formed in a mirror body in each of side mirrors positioned at both right and left sides of a center mirror and an illumination device is disposed on a rear side of the mirror body for performing irradiation toward a mirror surface through the light-transmitting part. Furthermore, the mirror cabinet of Patent Document 3 includes a light-emitting part for performing irradiation toward the mirror surface through the light-transmitting part and an angle adjusting actuator for adjusting an intersection angle between the mirror surface and a light-emitting surface of the light-emitting part. A user positioned in front of the side mirror is detected and the angle adjusting actuator is controlled so that the irradiation direction of the light-emitting part is directed toward the detected user.

CITATION LIST

Patent Documents

Patent Document 1: Japanese Patent Application Laid-Open No. 2003-217868
Patent Document 2: Japanese Patent Application Laid-Open No. Hei. 11-46945
Patent Document 3: Japanese Patent Application Laid-Open No. 2011-15892

SUMMARY OF THE INVENTION

Problem to be Solved by the Invention

When a user looks at one's own face in a mirror, there may be a case where the user turns the face with respect to the mirror surface in order to look at especially part of the face carefully in addition to a case where the user directly faces the mirror surface in order to look at the entire face. In the conventional illuminated mirror devices described in Patent Documents 1 to 3, however, illumination is given simply toward the front of the mirror surface or the control thereof is performed so that the irradiation direction of the light-emitting part is directed toward the user. Thus, there are disadvantages such that if the user turns the face with respect to the mirror surface, illumination light enters an eye of the user and thus the user feels dazzling and part of the face the user desires to look at cannot be illuminated precisely.

In view of this, the above-described disadvantages can be given as an example of problems to be solved by the invention. It is an object of the present invention to provide an illuminated mirror device capable of appropriately illuminating part of a face a user desires to look at when the user turns the face with respect to a mirror surface and a method for controlling the same.

Means to Solve the Problem

An illuminated mirror device of the invention according to claim 1 includes: a mirror; a light-emitting part for illumination disposed near the mirror; and driving means for driving the light-emitting part. Detection means for detecting a face direction of a person in front of the mirror with respect to the mirror is provided and the driving means controls an emission luminance distribution on a light-emitting surface of the light-emitting part on the basis of the face direction detected by the detection means.

A method for controlling illumination of the invention according to claim 12 is a method for controlling illumination of an illuminated mirror device, the illuminated mirror device including: a mirror; a light-emitting part for illumination disposed near the mirror; and driving means for driving the light-emitting part, the method including: a detection step of detecting a direction of a face of a person in front of the mirror with respect to the mirror; and a step of controlling an emission luminance distribution on a light-emitting surface of the light-emitting part by the driving means on the basis of the face direction detected by the detection step.

DESCRIPTION OF EMBODIMENTS

In the illuminated mirror device of the invention according to claim 1 and the method for controlling illumination of the invention according to claim 12, the direction of the face of a person in front of the mirror with respect to the mirror is detected and the emission luminance distribution on the light-emitting surface of the light-emitting part is controlled on the basis of the face direction. Thus, when the user turns the face with respect to the mirror, the part the user desires to look at can be appropriately illuminated and the illumination light can be prevented from entering an eye of the user from the direction to which the user has turned the face.

Embodiments

Hereinafter, embodiments of the present invention will be described in detail with reference to the drawings.

Figure 1:
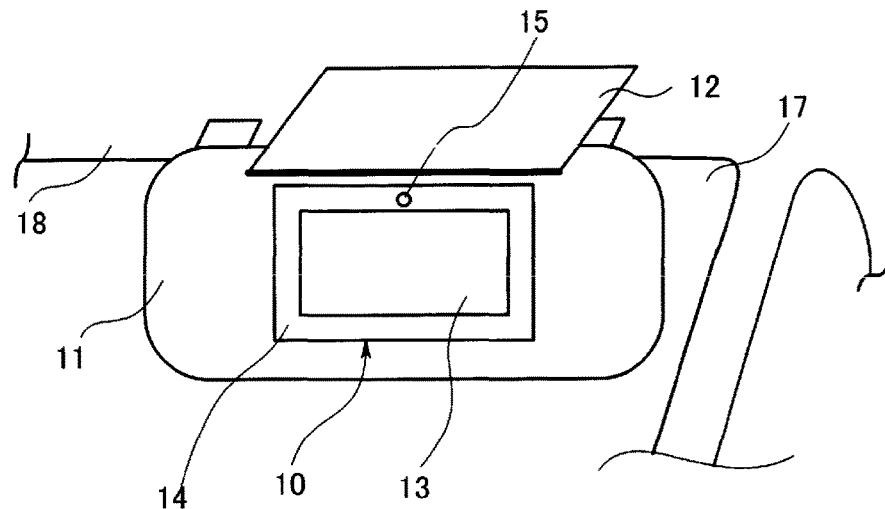
FIG. 1 is an external view illustrating an illuminated mirror device according to a first embodiment of the present invention.

FIG. 1 shows an appearance of an illuminated mirror device 10 according to the first embodiment of the present invention. The illuminated mirror device 10 is a vanity mirror attached to a rear side of a vehicle sun visor 11. As shown in FIG. 1, the sun visor 11 is pivotally supported by a vehicle indoor ceiling 18 in the vicinity of a windshield 17. A user lowers the sun visor 11 and further opens a flap 12 in order to use the mirror device 10.

The mirror device 10 includes: a mirror part 13 (mirror); a light-emitting part 14; and an image sensor 15. The perimeter of the rectangular mirror part 13 is surrounded by the frame-shaped light-emitting part 14. The image sensor 15 is disposed at a center in an upper frame portion of the light-emitting part 14. The image sensor 15 is a sensor for generating, as an image signal, a face image of a person in front of a mirror surface of the mirror part 13. Specifically, the image sensor 15 is an image pickup device configured by a photoelectric conversion element such as a CCD sensor or a CMOS sensor and converts a subject image formed by an imaging optical system into an image signal, i.e., an electric signal.

Figure 2:
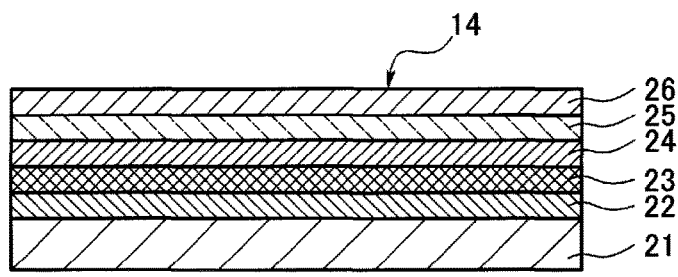
FIG. 2 is a cross-sectional view illustrating the structure of an element in an organic EL panel used in a light-emitting part of the mirror device of FIG. 1.

The light-emitting part 14 is composed of an organic EL panel. As shown in FIG. 2, such an organic EL panel has a structure including an anode 22 of a transparent electrode, an organic light-emitting layer 23, a cathode 24 of a metal electrode, an adhesion layer 25, and a protective sheet layer 26 layered in this order on a transparent substrate 21. The anode 22, the organic light-emitting layer 23, and the cathode 24 form an organic EL element. Although not shown in the figure, a plurality of such organic EL elements are formed on the transparent substrate 21.

The light-emitting part 14 employs the anodes 22 and the cathodes 24 of the plurality of organic EL elements as driving terminals. Moreover, in order to allow for driving control of an emission luminance distribution on a light-emitting surface in right and left two regions, the light-emitting part 14 includes the driving terminals for two circuits designed for the organic EL element (light source) in a left region 14L and for the organic EL element (light source) in a right region 14R.

Figure 3:
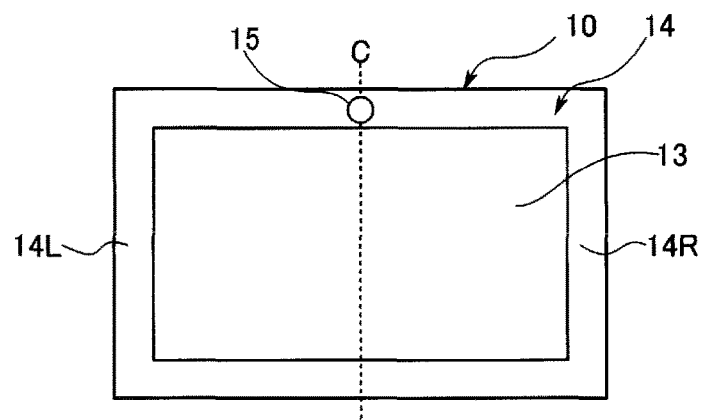
FIG. 3 is a plan view illustrating a surface of the mirror device of FIG. 1.

Note that the left region 14L refers to the left portion with respect to a line C (center line) equally dividing the light-emitting surface of the light-emitting part 14 into right and left halves and the right region 14R refers to the right portion with respect to the line C equally dividing the light-emitting surface of the light-emitting part 14 into right and left halves as shown in FIG. 3.

Note that materials, thicknesses, and manufacturing methods of the elements 21 to 26 of the organic EL panel are not particularly limited in the present invention.

Figure 4:
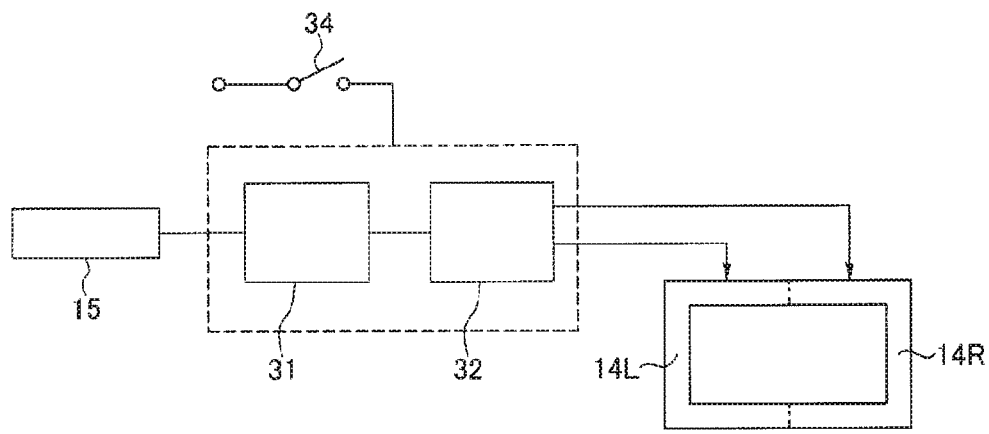
FIG. 4 is a block diagram illustrating a drive system of the light-emitting part of the mirror device of FIG. 1.

As shown in FIG. 4, driving means of the light-emitting part 14 includes a control circuit 31 and a drive circuit 32. The control circuit 31 also constitutes detection means for detecting a face direction of a user together with the image sensor 15. The control circuit 31 is formed by a CPU, for example. The control circuit 31 receives an output image signal from the image sensor 15, detects the face direction of a person on the basis of the image signal of the person in front of the mirror surface of the mirror part 13, and generates a control signal to the drive circuit 32 on the basis of the detected result of the face direction.

The drive circuit 32 supplies driving currents individually across the driving terminals of the two circuits of the light-emitting part 14 on the basis of the control signal supplied from the control circuit 31.

The flap 12 covers the mirror surface of the mirror part 13 in an openable manner. The flap 12 includes a mechanism (not shown) for maintaining an opened state.

A flap-linked switch 34 is an on-off switch linked with the movement of the flap 12. The flap-linked switch 34 is turned OFF when the flap 12 is in a closed state, whereas the flap-linked switch 34 is turned ON in the opened state. When the flap-linked switch 34 is in the ON state, a power-supply voltage is supplied to the control circuit 31 and the drive circuit 32. Moreover, when the flap-linked switch 34 is turned on, the image sensor 15 is also operated by the supply of the power-supply voltage from the control circuit 31.

In the thus configured mirror device 10, when a user opens the flap 12, the flap-linked switch 34 is turned on, thereby causing the operations of the control circuit 31, the drive circuit 32, and the image sensor 15.

Figure 5:
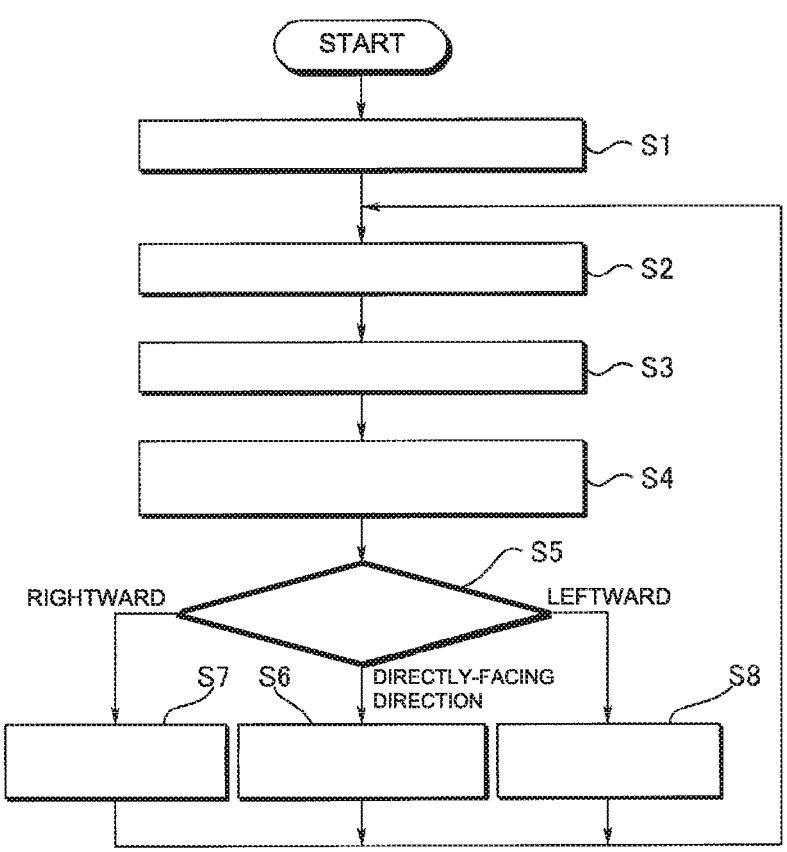
FIG. 5 is a flow chart illustrating operations of a control circuit in the drive system of FIG. 3.

As shown in FIG. 5, the control circuit 31 first instructs the drive circuit 32 to perform even illumination driving (step S1). In response to the instruction of the even illumination driving, the drive circuit 32 supplies an equal driving current to the respective organic EL elements in the left region 14L and the right region 14R of the light-emitting part 14. The left region 14L and the right region 14R of the light-emitting part 14 thereby emit light with the same luminance.

Next, the control circuit 31 reads the output image signal from the image sensor 15 (step S2) and performs a face contour detection processing (step S3) based on the image signal. In the face contour detection processing, the face contour of the person is detected from the edge in the image represented by the image signal. After the contour detection, the densities of right and left face parts within the face contour are detected (step S4). The density of face parts refers to the rate (ratio) of an area of a region occupied by face parts with a definite contour such as a mouth, an eye, an eyebrow, a nose, and the like in the range of a right or left half of the face contour, i.e., area density. At least one face part may be used for such density determination. After the density detection, unevenness between the densities in the right and left halves of the face contour is determined (step S5). If the difference between the density in the left half and the density in the right half falls within an acceptable range in the step S5, it is determined that the face of that person directly faces the mirror surface of the mirror part 13. If the difference between the density in the left half and the density in the right half within the contour exceeds the acceptable range and the density in the left half is higher than the density in the right half, it is determined that the face of that person is directed rightward from a direction directly facing the mirror surface of the mirror part 13. If the density in the right half is higher than the density in the left half, on the other hand, it is determined that the face of that person is directed leftward from the direction directly facing the mirror surface of the mirror part 13. More specifically, the reason is as follows. When the face of the person is directed leftward from the direction directly facing the mirror surface, the left side within the face contour from the perspective of the image (the right side from the perspective of the person) is occupied by a cheek (right cheek of the person) and the face parts such as a mouth, an eye, an eyebrow, and a nose are positioned mainly in the right side within the face contour, thereby increasing the density in the right half. Conversely, when the face of the person is directed rightward from the direction directly facing the mirror surface, the right side within the face contour (the left side from the perspective of the person) is occupied by a cheek (left cheek of the person) and the face parts are positioned mainly in the left side within the face contour, thereby increasing the density in the left half within the contour.

The steps S2 to S5 correspond to a determination part for detecting the face contour of the person from the image signal and determining the face direction of the person with respect to the mirror on the basis of the area density of the region of the face parts within the contour.

If the difference between the density in the left half and the density in the right half falls within the acceptable range, the control circuit 31 instructs the drive circuit 32 to perform the even illumination driving (step S6). This is the same as the step S1. If the density in the left half is higher than the density in the right half, the control circuit 31 instructs the drive circuit 32 to perform left illumination driving (step S7). In response to the instruction of the left illumination driving, the drive circuit 32 supplies driving currents to the organic EL elements in the left region 14L and the right region 14R with the driving current to the organic EL element in the left region 14L of the light-emitting part 14 being higher than the driving current to the organic EL element in the right region 14R. If the density in the right half is higher than the density in the left half, the control circuit 31 instructs the drive circuit 32 to perform right illumination driving (step S8). In response to the instruction of the right illumination driving, the drive circuit 32 supplies driving currents to the organic EL elements in the left region 14L and the right region 14R with the driving current to the organic EL element in the right region 14R of the light-emitting part 14 being higher than the driving current to the organic EL element in the left region 14L.

After any one of the steps S6 to S8 is executed, the control circuit 31 returns to the step S2 and repeats the above-described operations. Note that such repetition timing may occur immediately after the execution of any one of the steps S6 to S8 or every predetermined period (for example, one second).

Figure 6:
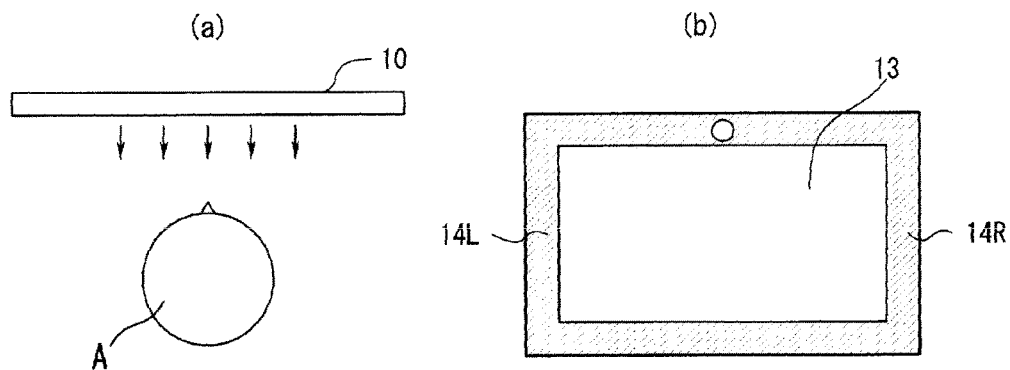
FIG. 6 is a diagram illustrating light-emitting states of a left region and a right region of the light-emitting part in association with a case where the face direction of a user is directed toward the direct front.
Figure 7:
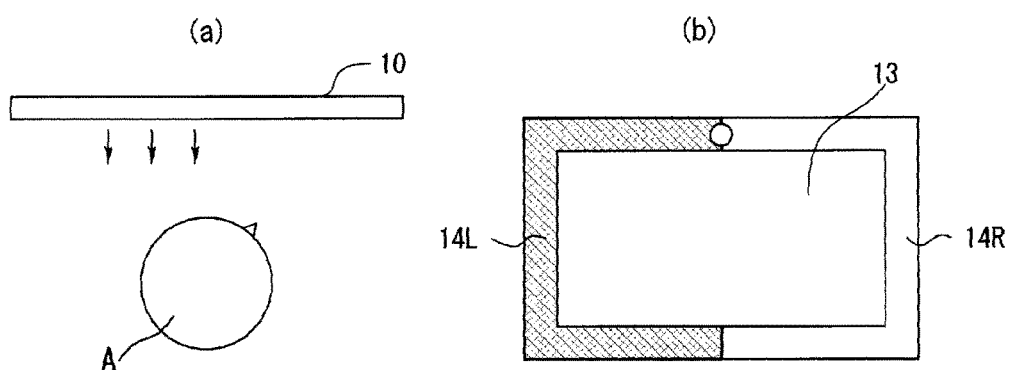
FIG. 7 is a diagram illustrating light-emitting states of the left region and the right region of the light-emitting part in association with a case where the face direction of a user is directed rightward.
Figure 8:
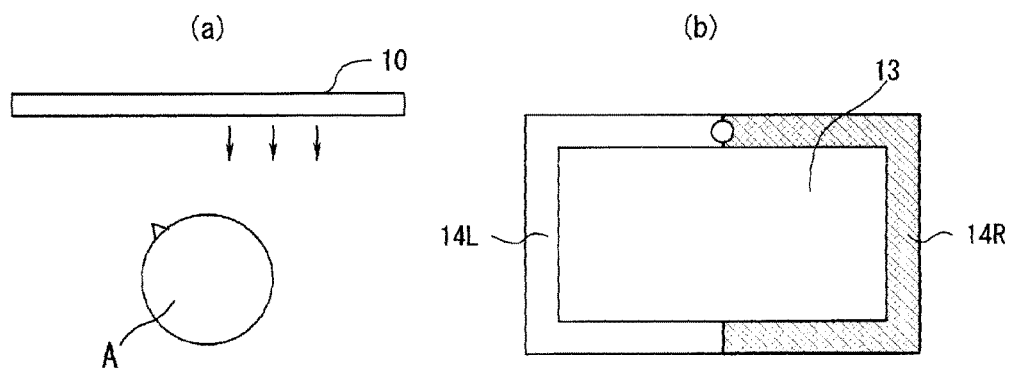
FIG. 8 is a diagram illustrating light-emitting states of the left region and the right region of the light-emitting part in association with a case where the face direction of a user is directed leftward.

Thus, according to the mirror device 10 of the first embodiment, when the face of a user A faces front (faces directly) with respect to the mirror surface of the mirror part 13 as shown in FIG. 6(a), the both of the left region 14L and the right region 14R of the light-emitting part 14 emit light with an even luminance, i.e., with an even luminance distribution as shown in FIG. 6(b). When the face of the user A is directed rightward with respect to the mirror surface of the mirror part 13 as shown in FIG. 7(a), the emission luminance of the left region 14L of the light-emitting part 14 becomes greater than the emission luminance of the right region 14R as shown in FIG. 7(b). When the face of the user A is directed leftward with respect to the mirror surface of the mirror part 13 as shown in FIG. 8(a), on the other hand, the emission luminance of the right region 14R of the light-emitting part 14 becomes greater than the emission luminance of the left region 14L as shown in FIG. 8(b). In this manner, the emission luminance distribution on the light-emitting surface is controlled so as to increase the brightness of the illumination with respect to part of the face the user A desires to look at on the mirror surface. Consequently, the user A who has turned one's own face is allowed to look at that part more clearly. In particular, even when the size is small as in the vanity mirror and the light-emitting region in the light-emitting part is therefore small, the part the user desires to look at can be illuminated brightly.

Note that FIGS. 6(a), 7(a), and 8(a) are views when the user A is seen from overhead. A protruding portion thereof represents a nose and arrows represent the emission of light from the light-emitting part 14.

When the user closes the flap 12, the flap-linked switch 34 is turned off, thereby stopping the supply of the power-supply voltage to the drive circuit 32 and the image sensor 15. Thus, the operations of the control circuit 31, the drive circuit 32, and the image sensor 15 are stopped, thereby stopping the emission of the light-emitting part 14.

In the above-described first embodiment, the light-emitting surface of the light-emitting part 14 is equally divided by the center line C into right and left halves, i.e., divided into the left region 14L and the right region 14R. If the detected face direction is shifted in the rightward direction from the direction directly facing the mirror surface, the luminance of the left region 14L is set to be greater than the luminance of the right region 14R. If the detected face direction is shifted in the leftward direction from the direction directly facing the mirror surface, the luminance of the right region 14R is set to be greater than the luminance of the left region 14L. In other words, according to the present invention, the light-emitting surface of the light-emitting part is equally divided by the center line into a first region and a second region. When the detected face direction is shifted from the direction directly facing the mirror surface, if the face direction with respect to the center line of the mirror surface is in the first region, the luminance of the second region opposite to the face direction should be set greater than the luminance of the first region. If the face direction with respect to the center line of the mirror surface is in the second region, on the other hand, the luminance of the first region opposite to the face direction should be set greater than the luminance of the second region. The direction of the center line of the light-emitting surface is not limited to the vertical direction or horizontal direction. Such a direction may be an oblique direction.

Moreover, in the above-described embodiment, the face direction of a user may be further detected in terms of an angle (for every 10 degrees, for example) and the emission luminance distribution on the light-emitting surface may be changed stepwise on the basis of the detected angle. Alternatively, the emission luminance distribution on the light-emitting surface may be changed continuously on the basis of the detected angle of the face direction. For example, in the case of the light-emitting part 14 in the above-described first embodiment, as an angle by which the face turns to the left or right becomes larger, a difference between the emission luminance of the left region 14L and the emission luminance of the right region 14R in the light-emitting part 14 may be set greater.

Furthermore, a difference between the emission luminance of the left region 14L and the emission luminance of the right region 14R in the light-emitting part 14 occurs when the face of a user is directed leftward or rightward with respect to the mirror surface of the mirror part 13 in the above-described first embodiment. However, the total luminance of the emission luminance of the left region 14L and the emission luminance of the right region 14R may be set constant at all times. This causes the luminance of the region toward which the user has turned one's own face to decrease, thereby preventing illumination light with a higher luminance from reaching an eye of the user. Thus, the user no longer feels dazzling. Also, the luminance of the region (14L or 14R) whose luminance should be greater when the face is turned may be further increased so as to exceed the even luminance when the face faces the front. Note that such a luminance adjustment can be achieved by controlling the magnitude of the driving current.

Moreover, although the emission luminance distribution on the light-emitting surface of the light-emitting part 14 is controlled in terms of two distributions in the left region 14L and the right region 14R in the above-described first embodiment, the present invention is not limited thereto. The emission luminance distribution may be controlled by further dividing the light-emitting surface into more regions.

In the above-described first embodiment, the light-emitting part 14 is configured to emit light when the flap 12 is in the opened state. However, instead of the flap 12, the light-emitting part 14 may be configured to emit light by the operations of the control circuit 31, the drive circuit 32, and the image sensor 15 when the presence of a user in front of the mirror surface of the mirror part 13 is detected. Alternatively, the light-emitting part 14 may be configured to emit light by the operations of the control circuit 31, the drive circuit 32, and the image sensor 15 when the flap 12 is in the opened state and the presence of a user in front of the mirror surface of the mirror part 13 is detected. In order to detect the presence of a user, an infrared sensor or a seating sensor for detecting the seating of a user on a seat may be employed.

Moreover, in the above-described first embodiment, the face direction of a user is determined on the basis of the area densities of face parts in the left half and right half within the face contour obtained from the output image signal from the image sensor 15. However, the face direction of a user may be determined on the basis of an image with the highest degree of similarity when the image within the face contour is compared with a directly-facing image, a left-facing image, and a right-facing image prepared in advance. Alternatively, the face direction may be determined on the basis of a position of a particular face part (for example, a nose) within the face contour.

Figure 9:
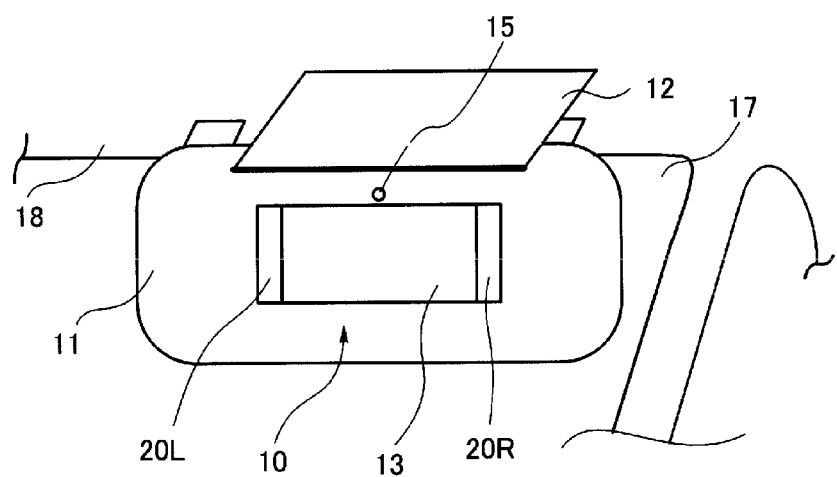
FIG. 9 is an external view illustrating a mirror device having a separated left light-emitting part and right light-emitting part with a mirror part interposed therebetween.

Moreover, although the light-emitting part 14 has an integral frame shape surrounding the mirror part 13 in the above-described first embodiment, the light-emitting part 14 may be separated into left and right parts such as a left light-emitting part 20L and a right light-emitting part 20R as shown in FIG. 9.

Although the image sensor 15 is disposed at the center in the upper frame portion of the light-emitting part 14, the image sensor 15 may be disposed separately from a device body including the mirror part 13 and the light-emitting part 14. For example, the image sensor 15 may be attached to the sun visor 11 as shown in FIG. 9. Alternatively, a camera for monitoring a driver in order to detect his or her sleepiness in a vehicle may be used also as the image sensor.

Moreover, although the organic EL element is employed as the light-emitting element of the light-emitting part 14 in the above-described first embodiment, an LED (light-emitting diode) may be used as the light-emitting element. Furthermore, not only the luminances of the left region 14L and the right region 14R but also emission colors thereof may be changed on the basis of the face direction of a user.

Figure 10:
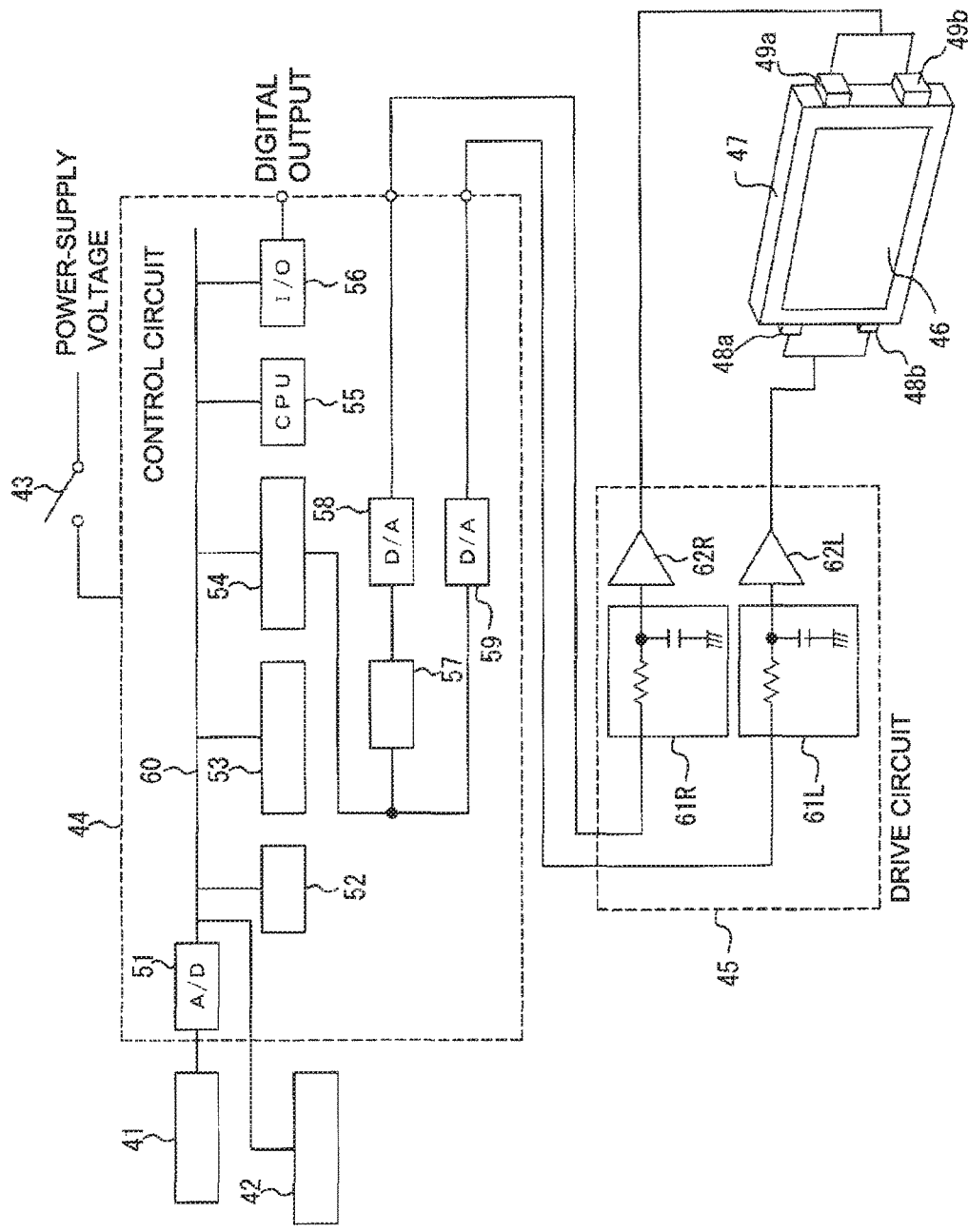
FIG. 10 is a block diagram illustrating the configuration of an illuminated mirror device according to a second embodiment of the present invention.

FIG. 10 shows the configuration of an illuminated mirror device with a half mirror according to the second embodiment of the present invention. The mirror device includes: an image sensor 41; an infrared sensor 42; a flap-linked switch 43; a control circuit 44; a drive circuit 45; a half mirror 46; a light diffusion plate 47; and LED chips 48a, 48b, 49a, and 49b. The light diffusion plate 47 and the LED chips 48a, 48b, 49a, and 49b of a light source part form a light-emitting part.

As shown in FIG. 10, the size of the half mirror 46 is slightly smaller than that of the light diffusion plate 47. The half mirror 46 is adhered to one of principal surfaces of the light diffusion plate 47. A surface of the half mirror 46 is a reflective surface, i.e., a mirror surface. The two LED chips 48a and 48b are attached to a left side surface of the light diffusion plate 47 and the two LED chips 49a and 49b are attached to a right side surface of the light diffusion plate 47. More specifically, when the LED chips 48a and 48b emit light, the light is allowed to enter the light diffusion plate 47 from the left side surface thereof and is diffused in the light diffusion plate 47. When the LED chips 49a and 49b emit light, the light is allowed to enter the light diffusion plate 47 from the right side surface thereof and is diffused in the light diffusion plate 47. The light diffusion plate 47 can create gradation as a result of the light diffusion.

The image sensor 41 is disposed at a center in an upper portion of the principal surface of the light diffusion plate 47 to which the half mirror 46 is adhered. The image sensor 41 is similar to the image sensor 15 in the first embodiment. The infrared sensor 42 is a sensor for detecting the presence of a user. The flap-linked switch 43 is the same as the flap-linked switch 34 in the first embodiment.

The control circuit 44 constitutes detection means together with the image sensor 41. As shown in FIG. 10, the control circuit 44 includes: an A/D converter 51; a memory 52; a contour detection circuit 53; a density determination circuit 54; a CPU 55; an I/O (input and output circuit) 56; a subtracter 57; and D/A converters 58 and 59. The A/D converter 51, the memory 52, the contour detection circuit 53, the density determination circuit 54, the CPU 55, and the I/O 56 are mutually connected to a common bus 60. The A/D converter 51 converts an image signal outputted from the image sensor 41 as an analog signal into a digital signal and supplies the digital signal to the common bus 60. Operation programs and processing data of the CPU 55 are stored in the memory 52. The contour detection circuit 53 is controlled by the CPU 55 and performs a face contour detecting operation corresponding to the above-described step S3. In other words, the face contour of the person is detected from the image represented by the digital image signal. The density determination circuit 54 is controlled by the CPU 55 and performs a density determining operation corresponding to the above-described steps S4 and S5. The A/D converter 51, the contour detection circuit 53, and the density determination circuit 54 correspond to a determination part for detecting the face contour of the person from the image signal and determining the face direction of the person with respect to the mirror on the basis of the area densities of the regions of the face parts within the contour.

Moreover, if the difference between the density in the left half and the density in the right half within the face contour falls within the acceptable range, the density determination circuit 54 supplies a digital output corresponding to 0.5 to the subtracter 57 and the D/A converter 59. If the difference between the density in the left half and the density in the right half within the contour exceeds the acceptable range, the density determination circuit 54 supplies a digital output corresponding to 1 to the subtracter 57 and the D/A converter 59 when the density in the left half is higher than the density in the right half (when the face is directed rightward), whereas the density determination circuit 54 supplies a digital output corresponding to 0 to the subtracter 57 and the D/A converter 59 when the density in the right half is higher than the density in the left half (when the face is directed leftward).

The subtracter 57 subtracts the output value of the density determination circuit 54 from 1 and supplies a digital value representing that result to the D/A converter 58. The D/A converter 58 converts the output digital value of the subtracter 57 into an analog signal and supplies the signal to a right input of the drive circuit 45. The D/A converter 59 converts the output value of the density determination circuit 54 into an analog signal and supplies the signal to a left input of the drive circuit 45.

The drive circuit 45 (driving means) comprises a right drive system connected to the right input and a left drive system connected to the left input. The right drive system includes: an integrating circuit 61R formed by a resistor and a capacitor; and a drive amplifier 62R. The left drive system includes: an integrating circuit 61L formed by a resistor and a capacitor; and a drive amplifier 62L. More specifically, the output signal of the D/A converter 58 is supplied to the drive amplifier 62R via the integrating circuit 61R and supplied to the LED chips 49a and 49b as a driving current from the drive amplifier 62R. Also, the output signal of the D/A converter 59 is supplied to the drive amplifier 62L via the integrating circuit 61L and supplied to the LED chips 48a and 48b as a driving current from the drive amplifier 62L.

Thus, according to the mirror device of the second embodiment, when the face of a user directly faces the mirror surface of the half mirror 46, the LED chips 48a, 48b, 49a, and 49b emit light with the same luminance. The light diffusion plate 47 thus emits light substantially at the entire surface thereof. When the face of the user is directed rightward from the direction directly facing the mirror surface of the half mirror 46, the LED chips 48a and 48b emit light whereas the LED chips 49a and 49b are turned off. At this time, the light diffusion plate 47 has such gradation that the emission luminance thereof gradually decreases from the left side toward the right. When the face of the user is directed leftward from the direction directly facing the mirror surface of the half mirror 46, on the other hand, the LED chips 48a and 48b are turned off whereas the LED chips 49a and 49b emit light. At this time, the light diffusion plate 47 has such gradation that the emission luminance thereof gradually decreases from the right side toward the left. Consequently, part a user desires to be reflected on the mirror surface is illuminated brightly also in the second embodiment. Thus, the user who has turned one's own face is allowed to look at that part more clearly.

Figure 11:
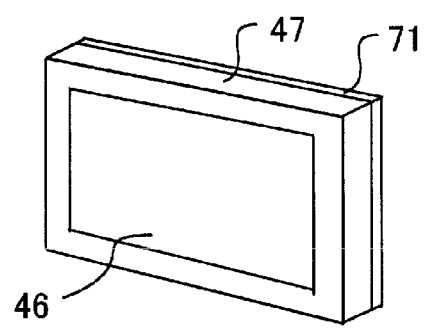
FIG. 11 is an external view illustrating an example in which an organic EL panel is applied to a light-emitting part of the mirror device of FIG. 10.

In the mirror device of the second embodiment, the LED chips 48a, 48b, 49a, and 49b are employed as a light source of the light-emitting part. However, instead of this, an organic EL panel 71 may be disposed on the principal surface opposite to the one of principal surfaces of the light diffusion plate 47 on which the half mirror 46 is provided as shown in FIG. 11. As an example of the organic EL panel 71, a surface-emitting full color type made of RGB organic EL elements may be used. Also in a mirror device having the configuration of FIG. 11, by controlling the light-emitting region of the organic EL panel 71, it is possible as with the second embodiment to cause the light diffusion plate 47 to have such gradation that the emission luminance thereof gradually decreases from the left side toward the right when the face of a user is directed rightward with respect to the mirror surface of the half mirror 46. When the face of the user is directed leftward with respect to the mirror surface of the half mirror 46, on the other hand, it is possible to cause the light diffusion plate 47 to have such gradation that the emission luminance thereof gradually decreases from the right side toward the left.

Moreover, in the mirror device of the second embodiment, the integrating circuits 61R and 61L having a time constant are provided. If the face direction of a user is changed only for a moment, such a movement is absorbed by the integrating circuits 61R and 61L. Accordingly, the emission luminance distribution in the light-emitting region of the organic EL panel 71 is prevented from changing due to a momentary change in the face direction, thereby making it possible to give the user soft illumination.

Figure 12:
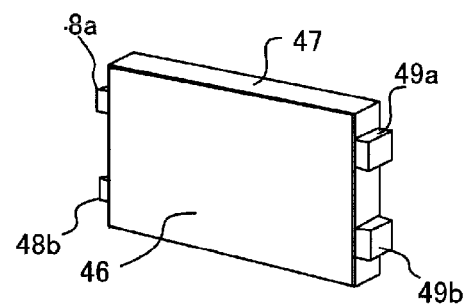
FIG. 12 is an external view illustrating a configuration example in which a half mirror covers the entire surface of a principal surface of a light diffusion plate in the mirror device of FIG. 10.

Furthermore, although the size of the half mirror 46 is made slightly smaller than that of the light diffusion plate 47 in the mirror device of the second embodiment, the half mirror 46 may have a size covering the entire principal surface of the light diffusion plate 47 as shown in FIG. 12. Although the half mirror is employed in the above-described second embodiment, a mirror which causes other mirror surface to totally emit light may be employed.

The above-described first and second embodiments each show the illuminated mirror device attached to a sun visor in a vehicle interior. However, the illuminated mirror device of the present invention is not limited to a mirror in a vehicle interior and may be applied to an object including a mirror such as a dresser, a full-length mirror, or a hand mirror.

Moreover, in the above-described first and second embodiments, the emission luminance distribution on the light-emitting surface of the light-emitting part is controlled on the basis of whether a user's face is directed leftward or rightward. However, the present invention is not limited thereto. The emission luminance distribution on the light-emitting surface of the light-emitting part may be controlled on the basis of whether a user's face is directed upward or downward. In other words, any configuration can be employed as long as the configuration increases the luminance of the region on the light-emitting surface corresponding to the direction having a symmetric relationship with the face direction detected by detection means. For example, as the face direction of a user is positioned more upward from the direct front of the mirror, the light-emitting part is driven such that the irradiation luminance of the light-emitting surface of the light-emitting part on the lower side of the face becomes higher than the irradiation luminance on the upper side thereof. As the face direction of the user is positioned more downward from the direct front of the mirror, on the other hand, the light-emitting part is driven such that the irradiation luminance on the upper side of the face becomes higher than the irradiation luminance on the lower side thereof.

REFERENCE NUMERALS LIST 11 sun visor
12 flap
13 mirror part
14 light-emitting part
15 image sensor
31, 44 control circuit
32, 45 drive circuit
34, 43 flap-linked switch
46 half mirror
47 light diffusion plate

The invention claimed is:

1. An illuminated mirror device comprising:
a mirror;
a light-emitting part for illumination disposed near the mirror; and
means for driving the light-emitting part, and
means for detecting a face direction of a person in front of the mirror with respect to the mirror, wherein
the means for driving controls an emission luminance distribution on a light-emitting surface of the light-emitting part based on the face direction detected by the means for detecting, wherein the means for driving sets a luminance of a region of the light-emitting surface opposite to the face direction with respect to a center line of the mirror so as to be greater than a luminance of a region of the light-emitting surface corresponding to the face direction when the face direction detected by the means for detecting is shifted from a direction directly facing the mirror.

2. The mirror device according to claim 1, wherein when the face direction detected by the means for detecting directly faces the mirror, the means for driving drives the light-emitting part so that the entire light-emitting surface of the light-emitting part emits light with an even luminance; when the means for detecting has detected that the turning of the face is directed in a leftward direction from the direction directly facing the mirror, the means for driving drives the light-emitting part so that an emission luminance in a right region with respect to the center line of the light-emitting surface is greater than an emission luminance in a left region with respect to the center line of the light-emitting surface; and when the means for detecting has detected that the face direction is directed in a rightward direction from the direction directly facing the mirror, the means for driving drives the light-emitting part so that an emission luminance in the left region is greater than an emission luminance in the right region.

3. The mirror device according to claim 2, wherein the light-emitting part has a frame-shaped light-emitting surface disposed on an outer periphery of the mirror; and
the means for driving individually drives a light source corresponding to the right region of the light-emitting surface and a light source corresponding to the left region according to the face direction detected by the means for detecting.

4. The mirror device according to claim 2, wherein the light-emitting part includes the left region and the right region interposing the mirror therebetween, and
the means for driving individually drives a light source corresponding to the right region of the light-emitting surface and a light source corresponding to the left region according to the face direction detected by the means for detecting.

5. The mirror device according to claim 1, wherein
the mirror is a half mirror, and
the light-emitting part includes a light source part and a light diffusion plate with the half mirror being adhered thereto at a surface opposite to a mirror surface thereof, and the light diffusion plate diffuses light emitted from the light source part.

6. The mirror device according to claim 5, wherein the light source part includes a left light source disposed on a left side surface of the light diffusion plate and a right light source disposed on a right side surface of the light diffusion plate.

7. The mirror device according to claim 6, wherein the light source part comprises a surface light source disposed on a surface of the light diffusion plate opposite to a surface to which the half mirror is adhered.

8. The mirror device according to claim 1, comprising:
a flap for covering the mirror in an openable manner; and
a flap-linked switch to be turned on when the flap is in an opened state to supply a power-supply voltage to the means for driving and to be turned off when the flap is in a closed state in order to stop the supply of the power-supply voltage to the means for driving.

9. The mirror device according to claim 1, comprising an infrared sensor for detecting presence of a person in front of the mirror, wherein
the means for driving drives the light-emitting part when presence of a person in front of the mirror is detected by the infrared sensor.

10. The mirror device according to claim 1 wherein
the means for detection includes:
an image sensor for image-capturing the face of the person in front of the mirror and generating an image signal; and
a determination part for detecting a contour of the face of the person from the image signal and determining a direction of the face of the person with respect to the mirror on the basis of an area density of a region of a face part within the contour.

11. A method for controlling illumination of an illuminated mirror device, the illuminated mirror device including: a mirror; a light-emitting part for illumination disposed near the mirror; and means for driving the light-emitting part, the method comprising:
detecting a direction of a face of a person in front of the mirror with respect to the mirror; and
controlling an emission luminance distribution on a light-emitting surface of the light-emitting part by the means for driving based on the face direction detected by the detecting, wherein when the face direction detected by the detecting is shifted from a direction directly facing the mirror, the controlling sets a luminance of a region of the light-emitting surface opposite to the face direction with respect to a center line of the mirror so as to be greater than a luminance of a region of the light-emitting surface corresponding to the face direction.

12. An illuminated reflective device including a plurality of light emitting portions attached to a reflective surface, the illuminated reflective device comprising:
one or more sensors configured to detect a difference between a first position and a second position of an object; and
a circuit configured to set a luminance of a first region of the light-emitting portions of the illuminated reflective device that corresponds to a face direction of the object to be smaller than a luminance of a second region of the light-emitting portions that corresponds to a direction different from the face direction of the object, in response to the one or more sensors detecting the first position and the second position of the object.

13. The illuminated reflective device of claim 12, wherein the circuit further comprises:
   detection circuitry configured to detect a motion of the object with respect to the reflective surface; and
   driving circuitry configured to drive the plurality of light-emitting portions based on the detected motion of the object.

14. The illuminated reflective device according to claim 13, wherein the driving circuitry determines a luminance distribution of the plurality of light-emitting portions continuously according to detection of an angle of the object, the objecting comprising a face of a person with respect to the reflective surface.

15. The illuminated reflective device according to claim 13, wherein the detection circuitry detects the object comprising a face part of the person.

16. The illuminated reflective device according to claim 12, wherein the one or more sensors comprises at least one of an image sensor and an infrared sensor.

17. A device, comprising:
   one or more sensors configured to detect at least one of (a) motion of a target object and output a first signal indicative of a detected motion of the target object, and (b) the target object positioned with respect to a reflective surface and output a second signal indicative of a detected position of the target object with respect to the reflective surface; and
   a control circuit configured to control a luminance distribution of a first region of a plurality of light-emitting devices disposed at the reflective surface that corresponds to a face direction of the object to be smaller than a luminance of a second region of the plurality of light-emitting devices that corresponds to a direction different from the face direction of the object, in response to at least one of the first signal received from the first sensor and the second signal received from the second sensor.

18. The device of claim 17, wherein the one or more sensors comprises:
   a first sensor configured to detect motion of a target object and output a first signal indicative of a detected motion of the target object;
   a second sensor configured to detect the target object positioned with respect to a reflective surface, and output a second signal indicative of a detected position of the target object with respect to the reflective surface.

19. The device of claim 17, wherein the light-emitting devices comprise organic light-emitting diode (OLED) devices.

20. The device of claim 17, wherein the control circuit is configured to control the luminance distribution of the plurality of light-emitting devices such that the luminance decreases in a direction of the detected position of the target object.

21. The device of claim 17, wherein the target object comprises a body part of a person.

22. The device of claim 17, wherein the reflective surface comprises a mirror.

* * * * *